United States Patent [19]
Allen

[11] 3,891,237
[45] June 24, 1975

[54] TRAILER HITCH

[76] Inventor: Bill Allen, 711 S. Austin, Marietta, Okla. 79088

[22] Filed: Mar. 29, 1974

[21] Appl. No.: 456,512

[52] U.S. Cl. ............... 280/477; 172/275; 280/415; 280/478 R; 280/508
[51] Int. Cl. .............................................. B60d 7/00
[58] Field of Search .......... 280/477, 478 R, 478 B, 280/508, 415 R, 415 A; 172/272, 275

[56] References Cited
UNITED STATES PATENTS

| | | | |
|---|---|---|---|
| 827,431 | 7/1906 | Evensen | 280/477 |
| 2,062,788 | 12/1936 | Jacob | 280/477 |
| 2,170,983 | 8/1939 | Adams | 280/478 R |
| 2,556,748 | 6/1951 | Buckley | 280/477 |
| 2,671,673 | 3/1954 | Benson | 280/477 |
| 2,804,315 | 8/1957 | Guye | 280/477 |
| 3,404,901 | 10/1968 | Rau | 280/482 X |

FOREIGN PATENTS OR APPLICATIONS

| | | | |
|---|---|---|---|
| 948,097 | 8/1956 | Germany | 172/275 |

*Primary Examiner*—Leo Friaglia
*Assistant Examiner*—R. Schrecengost
*Attorney, Agent, or Firm*—Robert K. Rhea

[57] ABSTRACT

An elongated member, adapted to be connected with a towed vehicle, is provided with an axial socket coaxial with a bell-shaped flange for guiding a shank, connected at one end by a ball joint to a traction vehicle, into the socket whereby a spring urged pawl engages a keeper notch formed in the shank for automatically coupling the traction vehicle to the towed vehicle.

4 Claims, 3 Drawing Figures

TRAILER HITCH

BACKGROUND OF THE INVENTION

1. Field of the Invention

The present invention relates to trailer hitches and more particularly to a fully automatic trailer hitch for coupling a traction vehicle to a towed vehicle.

One of the problems associated with effecting the juncture or coupling of a trailer hitch joining a traction vehicle to a towed vehicle, particularly when only the driver is present, is proper alignment of the two principal components of the trailer hitch connected respectively with the traction vehicle and the towed vehicle. Where the vehicle or trailer to be towed is a two-wheel trailer its tongue and trailer hitch components are normally resting on the surface of the earth and must be lifted for connection with the ball portion of the hitch connected with the traction vehicle. Where the towed vehicle or trailer is of the four-wheel type a similar problem exists, such as obtaining a proper separation or spacing between a traction vehicle and the towed vehicle to be connected by a trailer hitch so that a connection may be effected by the driver after stopping the traction vehicle.

2. Description of the Prior Art

U.S. Pat. Nos. 2,062,788 and 2,478,736 disclose automatic coupling type trailer hitches which feature a tapered wall for guiding a coupling member toward a socket which is then secured by dogs and a pin, respectively.

In each of these patents, forces tending to separate the hitch components, are applied to a single pin as in U.S. Pat. No. 2,478,736 and to a pair of pins supporting dogs in U.S. Pat. No. 2,062,788. In this invention a stop cooperates with a pawl in a manner which transfers towing forces to abutted portions of the hitch which eliminates shearing forces on pins, bolts, or the like.

SUMMARY OF THE INVENTION

An elongated shank, having one tapered end portion and a keeper notch adjacent its tapered end portion, is pivotally connected, at its other ends, to a traction vehicle by a ball joint and a guide spring normally maintaining the longitudinal axis of the shank horizontal. An elongated socket member, having an axial bore in one end portion, is rigidly connected at its other end portion to the tongue portion of a towed vehicle. A bell-shaped flange projects forwardly of the socket member coaxial with the axial bore. The socket member is provided with a spring urged pawl entering a lateral opening in the socket member for engagement with the keeper notch in the shank. An intermediate portion of the socket member forms a stop abutting the tapered end of the shank so that all longitudinal forces applied to the shank is transferred to the towing vehicle.

The principal object of this invention is to provide a trailer hitch which automatically couples hitch components respectively connected to traction and towed vehicles so that such coupling can be easily and quickly made by a single driver minuplating the traction vehicle and eliminates shearing forces on hitch connecting pins.

DESCRIPTION OF THE PREFERRED EMBODIMENT

Figure 1:
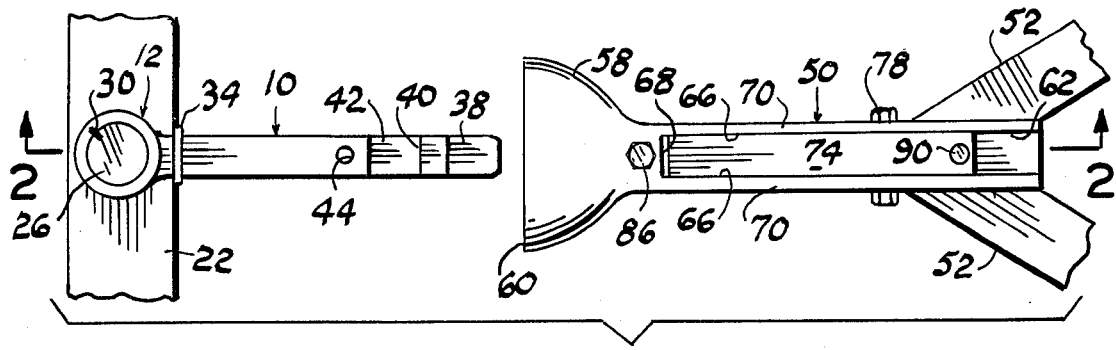
FIG. 1 is a top view of the trailer hitch components in exploded relation respectively connected to fragmentary portions of a traction vehicle and a towed vehcile.

Like characters of reference designate like parts in those figures of the drawings in which they occur.

In the drawings:

The reference numeral 10 indicates an elongated shank, preferably square in transverse section, having a forward or head end portion 12 provided with a part-spherical socket or recess 14 for cooperatively receiving the ball or spherical end portion 16 of a stem 18 extending through an aperture 20 formed in a rearward portion of a traction vehicle, such as a bumper or portion of the frame 22 and secured by a nut 24. The shank head 12 is provided with a threaded plug portion 26 having a diameter substantially equal to the diameter of the ball 16 for ease in fabrication and assembly of the ball-socket type juncture of the shaft with the stem 18. The plug 26 has a part-spherical surface 28 cooperating with the surface 14 and nesting the ball 16. The plug 26 is secured within the head, as by spot welding or staking, as indicated by the short heavy line 30. A guide spring 32, having an intermediate helical coil portion, is provided with loops 34 and 36 in its respective end portions for respectively surrounding an intermediate portion of the stem adjacent the frame 22 and the shank adjacent its head 12. The purpose of the guide spring 32 is to normally maintain the longitudinal axis of the shank 10 horizontal for the purposes presently explained.

Figure 2:
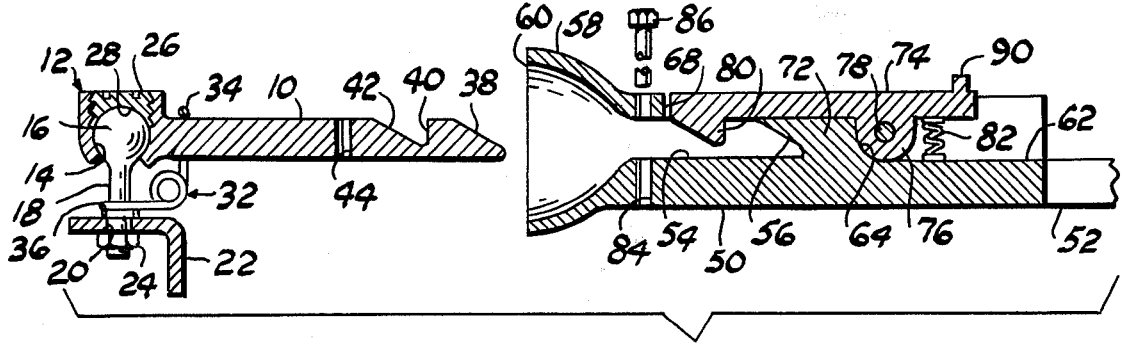
FIG. 2 is a vertical cross sectional view taken substantially along the line 2—2 of FIG. 1; and, FIG. 3 is a view similar to FIG. 2 illustrating the trailer hitch components in coupled relation and illustrating, by dotted lines, the keeper notch released position of the pawl.

The other or rearward end portion of the shank is transversely cut away to form an upward and forwardly inclined surface 38 for the purposes presently explained. A transverse keeper notch is formed in this end portion of the shank and is characterized by a vertical surface 40 normal to the longitudinal axis of the shank and a forwardly and upwardly inclined surface 42, as viewed in FIGS. 2 and 3, for the purposes presently explained. Adjacent the notch surface 42 the shank is further provided with a vertical aperture 44 for receiving a locking pin as presently described.

The numeral 50 indicates an elongated socket member substantially rectangular in transverse section which is connected at its rearward end portion to the tongue 52 and projects forwardly of the forward end portion of a towed vehicle, as by welding or bolts, not shown. The other or forward end portion of the socket member is provided with an axial bore 54, square in cross section, for cooperative reception of the notched end portion of the shank. The inner limit of the bore 54 is characterized by a tapered surface 56 mating with the shank end tapered surface 38. The forward end portion of the socket member is provided with a substantially bell-shaped flange 58 coaxial at its smaller diameter with the axial bore 54 and open at its larger end 60 in a forward direction for guiding the tapered end portion of the shank 10 into the axial bore 54. The axial length of the bell flange 58 is preferably at least equal to three times the transverse dimension of the shank and the inside diameter of the larger end portion of the bell flange is at least four times the transverse dimension of the shank. The rearward end portion of the socket member 50 is provided, between its lateral surfaces, with a recess 62 terminating at its forward limit intermediate the ends of the socket member and spaced rearwardly of the axial bore 54 in a transverse arcuate surface 64 extending through an arc of at least 90°. Between its lateral limits the socket member is further longitudinally recessed, as at 66, in communication with the rearward recess 62 terminating forwardly by a wall surface 68 normal to the axis of the axial bore 54. The recesses 62 and 66 thus define upstanding lateral walls 70 and a socket member stop portion 72 between the innerlimit of the axial bore and the transverse arcuate surface 64. The depth of the longitudinal recess 66 is such that it provides communication with the rearward end portion of the axial bore 54 between the transverse recess forming forward wall 68 and forward limit of the axial bore inclined surface 56.

Figure 3:
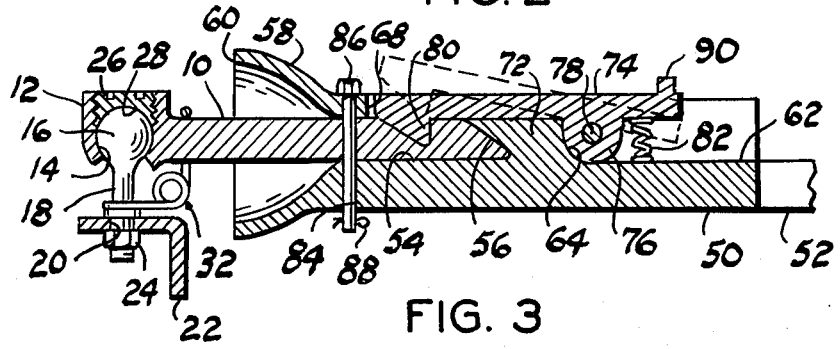

An elongated lever or pawl 74, loosely received between the opposing walls 70, is provided, adjacent its rearward end, with a part cylindrical depending lug 76 rotatably contacting the arcuate surface 64 and secured between the walls 70 by a bolt 78, or the like. The forward end portion of the pawl 74 is provided with a depending dog 80 cooperatively engaging the vertical and inclined surfaces of the keeper notch. A compression spring 82 is interposed between the rearward end portion of the pawl and upwardly facing surface forming the lower limit of the socket member recess 62. Between the recess end limit wall 68 and bell flange 58 the socket member is vertically apertured, as at 84, for loosely receiving a locking pin 86 cooperatively extending through the shank aperture 44 when the trailer hitch is coupled, as illustrated in FIG. 3.

OPERATION

In operation the operator assertains that the longitudinal axis of the shank 10 is disposed horizontally and in substantial axial alignment with the axial bore 54 of the socket member. To accomplish this, in a four-wheel trailer vehicle, the tongue portion 52 of the trailer is coaxially aligned with the longitudinal axis of the trailer and is normally disposed in a horizontal plane. In the event a two-wheel trailer is being coupled with the shank the forward end portion of the two-wheel trailer tongue, having the socket member 50 thereon, must be horizontally supported, as by blocks or other suitable support means. The operator substantially axially aligns the traction vehicle with the towed vehicle with the traction vehicle in front of the towed vehicle and slowly backs the traction vehicle toward the towed vehicle so that the tapered end portion of the shank enters and contacts the innersurface of the bell-shaped flange 58 which, if not axially aligned with the shank guides the rearward free end portion of the shank into the axial bore. Rearward movement of the shank into the bore lifts the pawl 74 by the tapered end surface 38 of the shank slidably engaging the tapered end surface of the pawl dog 80 so that when the shank 10 is fully inserted into the axial bore 54 gravitational attraction on the pawl assisted by the compression spring 82 engages the dog 80 within the shank keeper notch. As an added safety feature, the locking pin 86 is then extended through the aligned apertures 44 and 84 and secured therein, as by a cotter pin, or the like, 88.

In the hitch coupled position (FIG. 3) rearward movement of the traction vehicle, as when backing the trailer, force applied to the shank 10 is transferred by the socket member stop portion 72 to the trailer and conversely during forward or towing movement of the traction vehicle the force applied to the shank is transferred by the pawl dog 80, engaging the keeper notch vertical surface 40 and by the pawl cylindrical portion 76 engaging the rearward arcuate surface 64, to the socket member stop 72. Thus forward and rearward movement of the traction vehicle force is not applied to either the pawl connecting bolt 78 or the locking pin 86. The hitch is uncoupled by removing the locking pin 86 and manually applying a depressing force to an upstanding button or projection 90 formed on the rearward end portion of the pawl 74.

Obviously the invention is susceptible to changes or alterations without defeating its practicability, therefore, I do not wish to be confined to the preferred embodiment shown in the drawings and described herein.

I claim:

1. A trailer hitch for automatically coupling a traction vehicle to a towed vehicle, comprising:

an elongated shank having a keeper notch adjacent one end;

an elongated socket member having an axial bore in one end portion for receiving the notched end portion of said shank, said socket member having a bell-shaped flange coaxial with the axial bore and having a lateral opening communicating with the axial bore, said socket member having an upwardly open elongated recess in its end portion opposite the axial bore forming opposed upstanding walls and a transverse upstanding stop section between the axial bore and the recess, said stop section forming the inward limit of the socket member axial bore;

a pawl pivotally connected with said socket member and engageable with the keeper notch, said pawl being disposed between said walls within the elongated recess in overlying relation intermediate its ends with respect to said stop section and having a part-cylindrical portion abutting said stop section opposite said shank; and, a spring normally biasing said pawl into the socket member lateral opening, whereby said stop section, by being disposed between the rearward limit of said shank and said pawl part-cylindrical portion, prevents forward or rearward movement of a towed vehicle with respect to a towing vehicle.

2. The trailer hitch according to claim 1 in which the other end of said shank forms a part-spherical recess; and, a stem having a threaded end portion for connection with a vehicle and having a ball head at its other end snugly received within the part-spherical recess.

3. The trailer hitch according to claim 2 and further including:

a guide spring connected with said shank and said stem for normally maintaining the longitudinal axis of said shank horizontal.

4. The trailer hitch according to claim 3 in which said socket member and said shank are each provided with a transverse aperture; and, a locking pin removably received by the apertures when in aligned relation.

* * * * *